Figure 1:
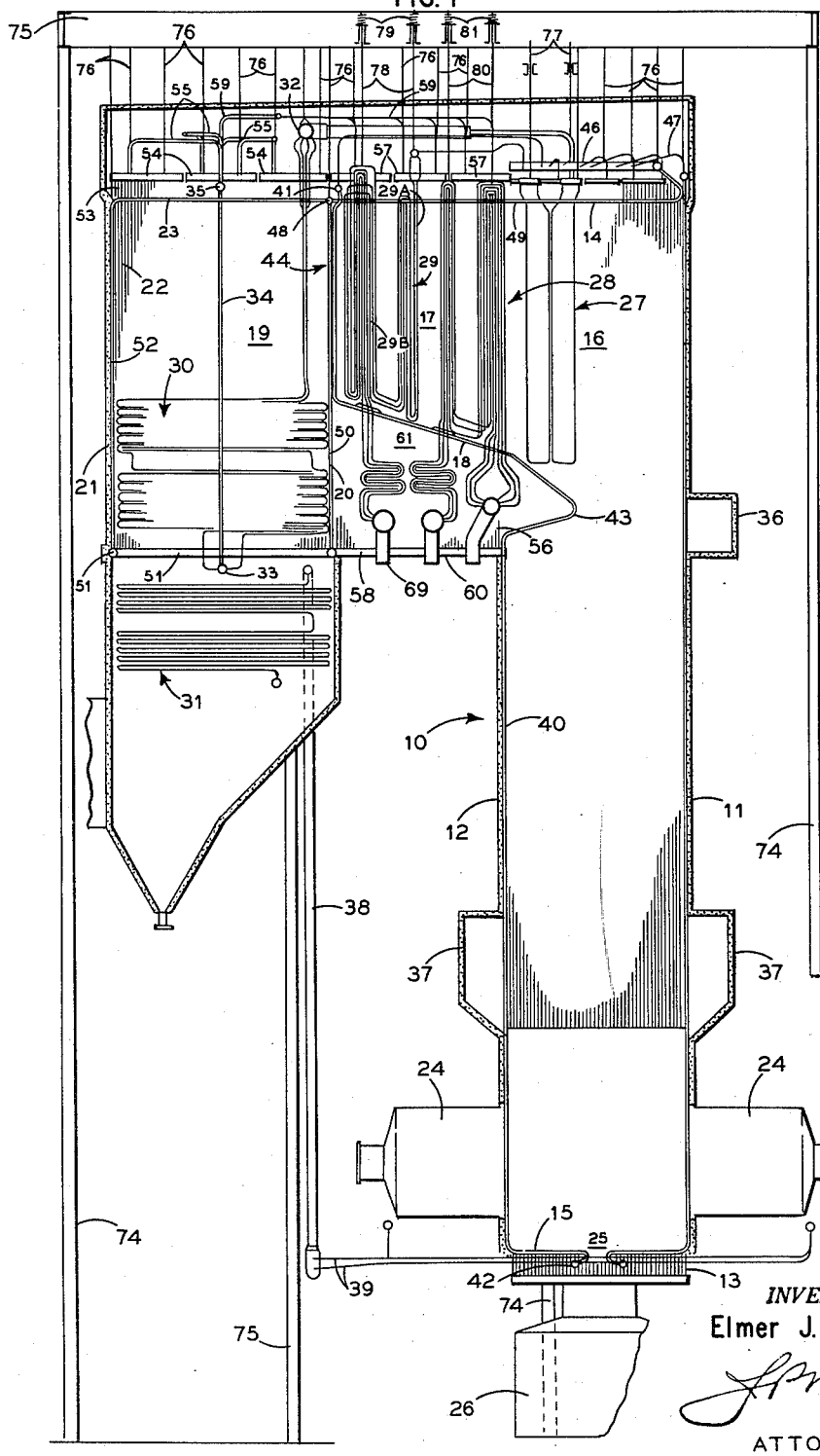

Sept. 26, 1961　　　　E. J. FORSMAN　　　　3,001,514
SUPPORT AND EXPANSION APPARATUS FOR A VAPOR
GENERATING AND SUPERHEATING UNIT
Filed May 13, 1959　　　　　　　　　　5 Sheets-Sheet 1

INVENTOR.
Elmer J. Forsman

ATTORNEY

Sept. 26, 1961   E. J. FORSMAN   3,001,514
SUPPORT AND EXPANSION APPARATUS FOR A VAPOR
GENERATING AND SUPERHEATING UNIT
Filed May 13, 1959   5 Sheets-Sheet 2

INVENTOR
Elmer J. Forsman
BY
ATTORNEY

Sept. 26, 1961 E. J. FORSMAN 3,001,514
SUPPORT AND EXPANSION APPARATUS FOR A VAPOR
GENERATING AND SUPERHEATING UNIT
Filed May 13, 1959 5 Sheets-Sheet 3

INVENTOR.
Elmer J. Forsman
BY
ATTORNEY

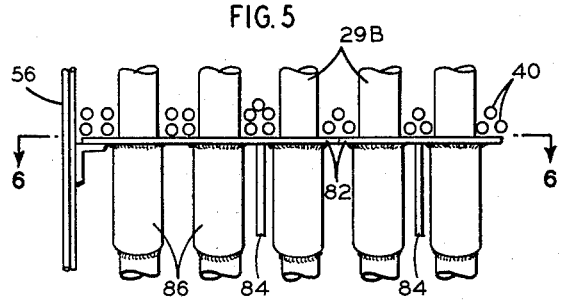
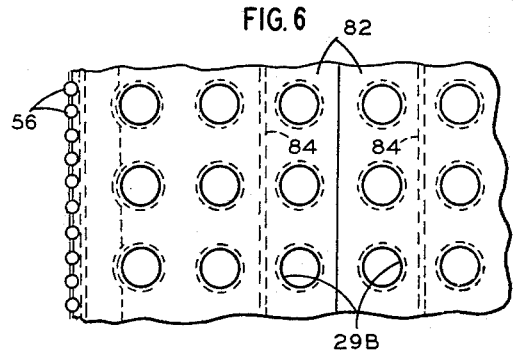
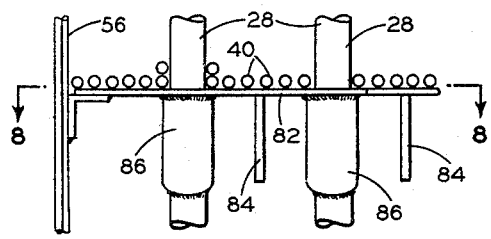
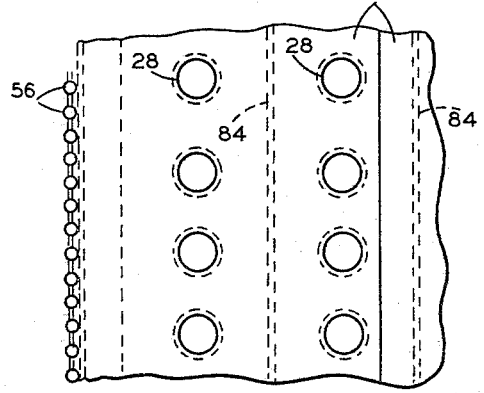
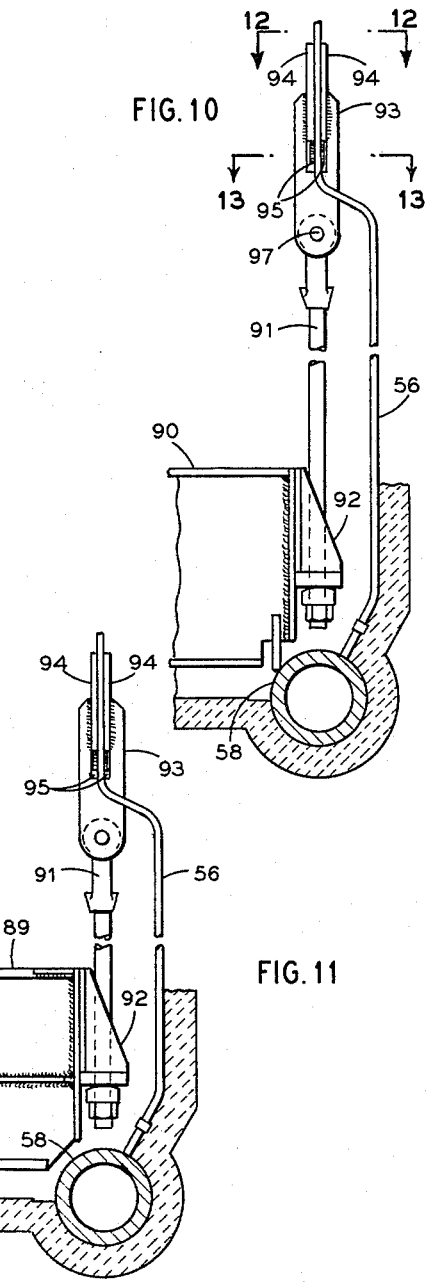
INVENTOR.
Elmer J. Forsman
ATTORNEY INVENTOR.
Elmer J. Forsman United States Patent Office 3,001,514
Patented Sept. 26, 1961

3,001,514
SUPPORT AND EXPANSION APPARATUS FOR A VAPOR GENERATING AND SUPERHEATING UNIT
Elmer J. Forsman, Wadsworth, Ohio, assignor to The Babcock & Wilcox Company, New York, N.Y., a corporation of New Jersey
Filed May 13, 1959, Ser. No. 812,890
5 Claims. (Cl. 122—510)

This invention relates in general to fluid heating units and more particularly to improvements in the supports for and relative arrangement of fluid heating and superheating tubes adapted for use in a vapor generating and superheating unit.

The customary practice in the design of units of the above described character has been to locate the terminal header of the superheater at the top of the unit, or the furtherest point away from the turbine. Thus a relatively long conduit is required to connect the terminal header to the turbine, this conduit being generally made of costly high alloy piping and substantial thickness. While the cost of this piping may be considerably reduced by locating the terminal header below the main body of the superheater, this arrangement presents the problem of passing the superheater tubes to the terminal header through the adjacent boundary wall of the gas pass in which the main body of the superheater is located and the problem of compensating for differential movement between the superheater and the fluid heating tubes lining the walls of the superheater gas pass.

The present invention solves the foregoing problem by special provisions for supporting the superheater and the fluid heating tubes lining the boundary walls of the superheater gas pass and for compensating for differential expansions therebetween. In accordance with the invention a unit of the character described is provided with a superheater disposed in most part within a horizontally extending gas pass supplied with high temperature heating gases and defined by walls including vapor generating tubes. The superheater is connected for series flow of fluid from the vapor generating tubes and to a horizontally extending outlet header positioned subjacent the superheater gas pass. Provisions are made to tie the superheater outlet header to the tubes of the side walls of the gas pass, thereby transmitting the load of the header to these tubes while maintaining a fixed relationship therebetween, and to top support the superheater and the vapor generating tubes of the gas pass. Relative movement between the superheater and the vapor generating tubes of the gas pass is compensated for by bending the discharge portion of the superheater tubes into nested multi-looped tube groups disposed between the superheater outlet header and the floor of the gas pass.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred form of the invention.

Figure 4:
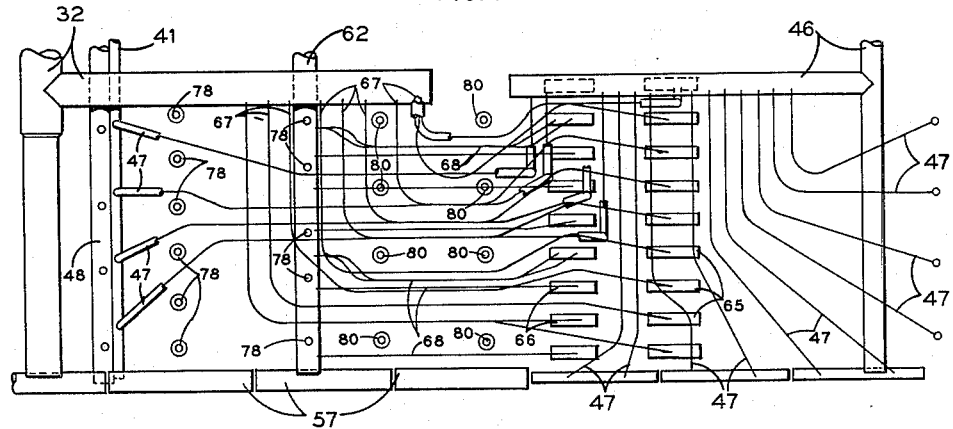
Figure 2:
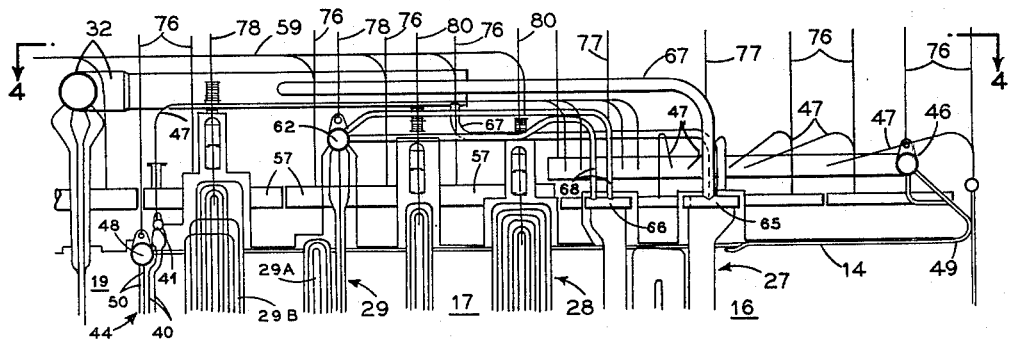
Figure 12:
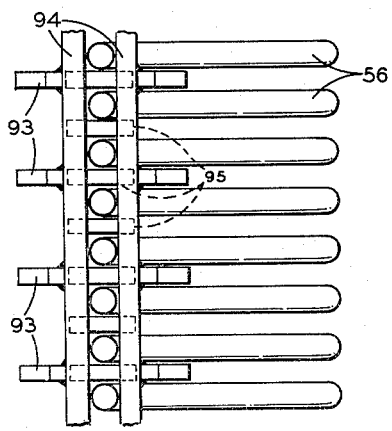
Figure 13:
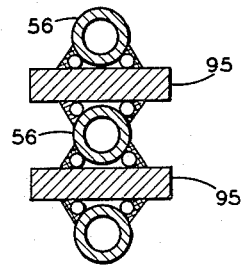
Figure 3:
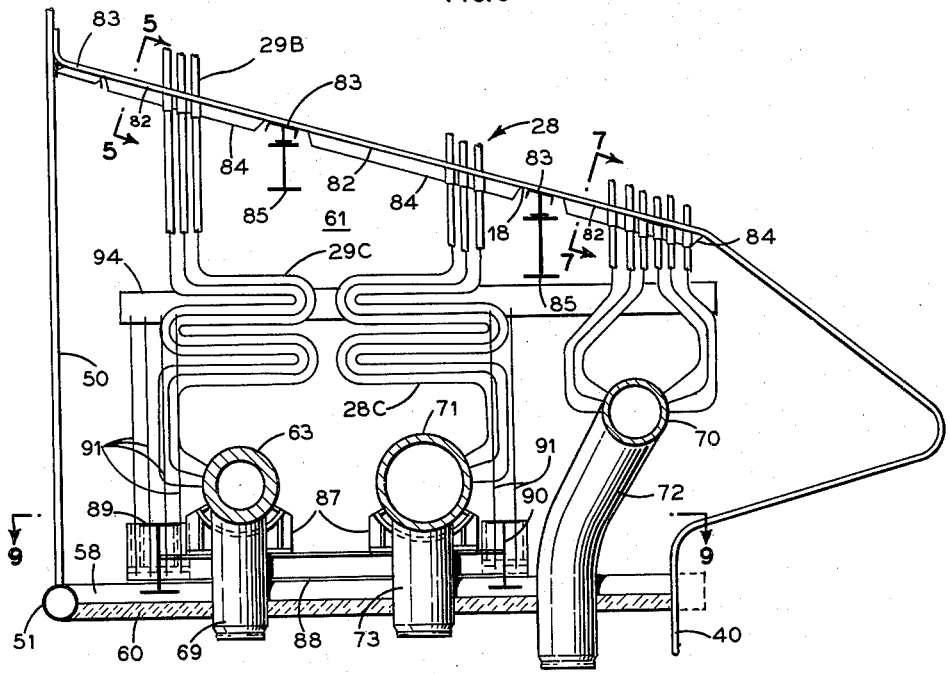
Figure 14:
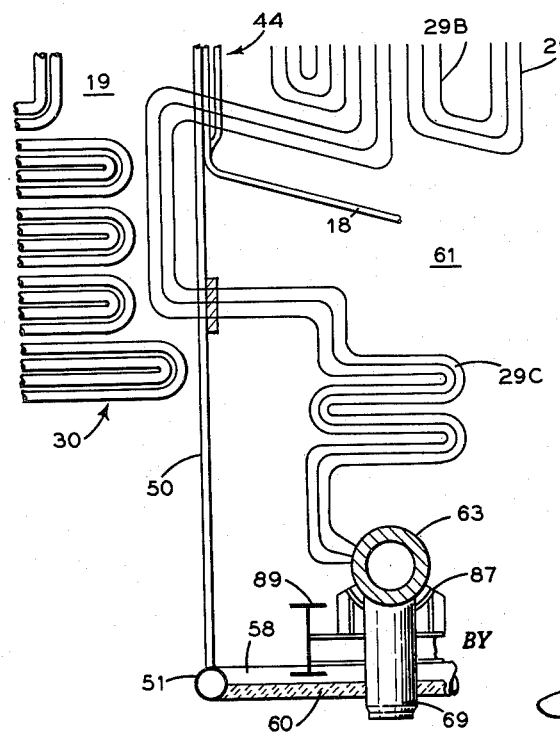
Figure 9:
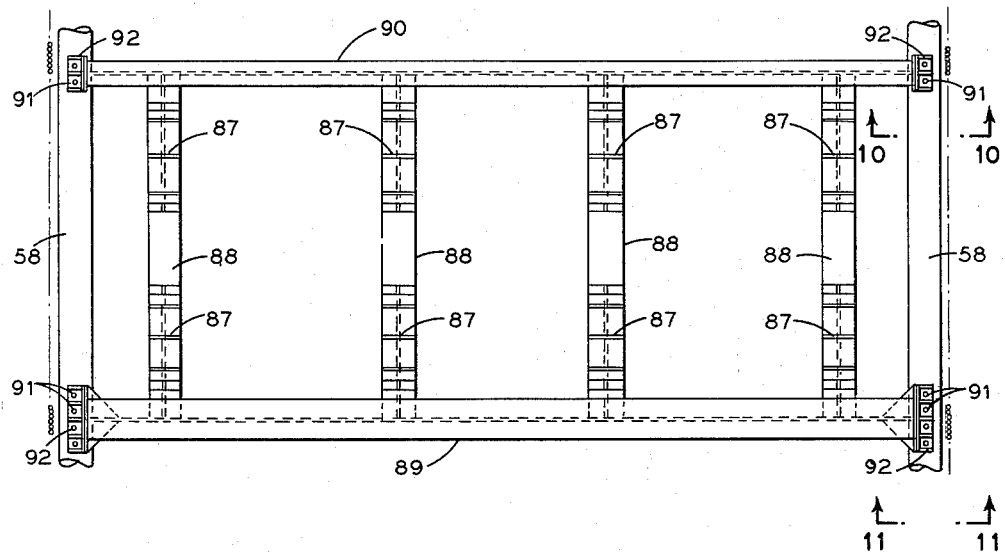

Of the drawings:
FIG. 1 is a partially diagrammatic sectional elevation of a forced circulation once-through vapor generating and superheating unit embodying the invention;
FIGS. 2 and 3 are enlarged views of portions of the structure illustrated in FIG. 1;
FIG. 4 is a partial sectional plan view taken along the line 4—4 of FIG. 2;
FIG. 5 is a sectional view taken along the line 5—5 of FIG. 3;
FIG. 6 is a sectional view taken along the line 6—6 of FIG. 5;
FIG. 7 is a sectional view taken along the line 7—7 of FIG. 3;
FIG. 8 is a sectional view taken along the line 8—8 of FIG. 7;
FIG. 9 is a partial sectional plan view taken along the line 9—9 of FIG. 3;
FIG. 10 is a sectional view taken along the line 10—10 of FIG. 9;
FIG. 11 is a sectional view taken along the line 11—11 of FIG. 9;
FIG. 12 is a sectional view taken along the line 12—12 of FIG. 10;
FIG. 13 is a sectional view taken along the line 13—13 of FIG. 10; and
FIG. 14 is a fragmentary diagrammatic sectional elevation showing a modification to the secondary superheater tube arrangement.

In the drawings the invention has been illustrated as embodied in a top-supported forced flow once-through vapor generating and superheating unit designed for the production of superheated steam at pressures and temperatures below the critical pressure of 3206 p.s.i. and the critical temperature of 705° F., a unit of this general construction being disclosed and claimed in the co-pending applications of Paul H. Koch, Serial No. 735,819, filed May 16, 1958, now Patent No. 2,962,005, and Serial No. 781,576, filed December 19, 1958.

It will be understood that the support and expansion elements illustrated and hereinafter described can also be advantageously used in a forced flow once-through fluid heating unit designed for super-critical pressures and temperatures, in a recirculating forced flow fluid heating unit, and in a natural circulation fluid heating unit.

The main portions of the unit illustrated include an upright furnace chamber 10 of substantially rectangular horizontal cross-section defined by a front wall 11, a rear wall 12, and side walls 13, a roof 14, and a floor 15 and having a gas outlet 16 at its upper end opening to a horizontally extending gas pass 17 of rectangular vertical cross-section formed by extensions of the furnace roof 14 and side walls 13 and an upwardly and rearwardly inclined floor 18. The boundary walls of the furnace chamber 10 are formed by insulation covered metallic casing lined by fluid heating tubes secured thereto. The gas pass 17 communicates at its rear end with the upper end of an upright gas passage 19 of rectangular cross-section defined by a front wall 20, a rear wall 21, side walls 22 and a roof 23. The fuel firing section consists of idependently operable horizontally extending cyclone type furnaces 24 lined by fluid heating tubes and disposed at the same level on opposite walls 11 and 12 at the lower portion of the furnace chamber 10. Each cyclone furnace is arranged to burn solid fuel at high rates of heat release and to separately discharge high temperature gaseous products of combustion and separated ash residue as a molten slag into the lower portion of the chamber 10 through openings in the corresponding boundary wall thereof. The floor 15 is formed with a plurality of transversely spaced openings 25 for the discharge of molten slag to a slag tank 26. The gas pass 17 is occupied by a first-stage secondary superheater 27, a reheater 28, and a second-stage secondary superheater 29 arranged in series with respect to gas flow. The gas passage 19 is occupied by a primary superheater 30 and an economizer 31 arranged in series with respect to gas flow. The primary superheater 30 comprises horizontally extending multiple-looped tubes arranged for vapor flow in counterflow relation with the heating gases, having their inlet ends connected to a transversely extending header 33 and their outlet ends connected to a horizontally arranged T-shaped header 32, and top-supported by two rows of vertically extending fluid heating tubes 34 having their inlet ends connected to a transverse header 35 and their outlet ends connected to the header 33. The economizer 31 comprises horizontally extending multiple-looped tubes arranged for liquid flow in counterflow heat transfer relation with the gases. The heating gases from the gas passage 19 flow to an air heater, not shown, then pass through an induced draft fan to the stack. A portion of the relatively cool gases leaving the air heater are recycled by a gas recirculating fan, not shown, to the upper and lower portions of the chamber 10 by way of ducts 36 and 37, respectively, and suitable openings formed in the boundary walls of the furnace chamber.

Feedwater at a pressure of 3070 p.s.i.g. is supplied by a feed pump, not shown, to the economizer 31 wherein it is partially heated. From the economizer the fluid flows through a downcomer 38 and supply tubes 39 to and through the cyclone furnace fluid heating circuits, the construction and arrangement of which are disclosed in the aforesaid application Serial No. 781,576, then passes to the fluid heating tubes lining the front, rear and side walls of the furnace chamber 10.

The boundary walls of the furnace 10, the gas pass 17 and the upright gas passage 19 are lined by vertically extending parallel tubes. In particular, the rear wall 12 has a row of tubes 40 extending between upper and lower headers 41 and 42. The tubes 40 have their upper portions bent inwardly and upwardly to form a nose arch 43; then rearwardly and upwardly to line the floor 18 of the gas pass 17; and then vertically for connection to the header 41 and to form part of a screen 44 disposed at the discharge end of the gas pass 17. The outlet headers of the fluid heating tubes of the boundary walls of the furnace chamber 10 are connected for series flow of the vapor-liquid mixtures generated in these tubes to a T-shaped header 46 by tubular connectors 47. The vapor-liquid mixtures are mixed in passing through the header 46 so that the enthalpy, and thereby the temperature, will be substantially uniform upon discharge therefrom. The header 46 is connected for flow of the vapor-liquid mixtures to a horizontally extending header 48 by a row of tubes 49 forming the roof of the furnace 10 and the gas pass 17.

The front wall 20 of the gas passage 19 is formed in most part by a row of vertically extending parallel tubes 50 having their intertube spaces at the lower portions closed by metallic webs; their inlet ends connected to the header 48; their outlet ends connected to a continuous horizontally arranged header 51 disposed along the periphery of the gas passage 19 at a position intermediate the economizer 31 and the primary superheater 30; and their upper portions bent to form, along with the upper portions of the tubes 40, the screen 44. The roof 23 is formed by and the rear wall 21 is lined by a row of upwardly extending closely spaced parallel tubes 52 having their inlet ends connected to the header 48 and their outlet ends connected to the header 51. Each side wall 22 is lined by a row of tubes 53 arranged in groups to form co-planar tubular panels extending between a corresponding number of upper headers 54 and the header 51, with the upper headers being connected for flow of fluid to the header 35 by tubes 55.

The portion of each of the side walls of the gas pass 17 downstream of the gas inlet end of the reheater 28 is lined by a row of vertically extending closely spaced parallel tubes 56 having their intertube spaces closed by metallic webs and arranged in groups to form tubular panels extending between a corresponding number of horizontally arranged upper or outlet headers 57 and a horizontally extending common lower header 58 disposed between the rear wall 12 and the front wall 20, with the headers 57 being connected for flow of fluid to the header 35 by tubes 59 and the header 58 being connected at one end to the header 51 for flow of fluid therefrom. The remaining portions of the side walls of the gas pass 17 are lined by extensions of the fluid heating tubes lining the side walls 13 of the furnace 10. The lower portions of the tubes 56 cooperate with the floor of the gas pass 17, the front wall 20 and a floor 60 to form an idle compartment 61.

The secondary superheater 27 comprises horizontally spaced pendently supported tube platens arranged in vertical planes in the direction of gas flow and for vapor flow in parallel flow heat transfer relation with the gases, with each platen having a multiplicity of nested return bend tubes connected at their opposite ends to external inlet and outlet headers 65 and 66, respectively, with the inlet headers 65 being connected to the header 32 by tubes 67 and the outlet headers 66 connected to an external transversely extending inlet header 62 for the secondary superheater 29 by tubes 68. The vapor receives its final superheating in the secondary superheater 29 and is discharged to a conduit 69 for flow to the high pressure stage of a vapor turbine, not shown.

The secondary superheater 29 comprises two groups 29A, 29B of vertically extending nested multi-looped tubes arranged in laterally spaced panels serially connected to define parallel flow paths for vapor flow between the header 62 and a horizontal outlet header 63 disposed within and across the compartment 61, with the tubes of group 29A being arranged so that the vapor flows in parallel flow heat transfer relation with the gases passing through the gas pass 17 and the tubes 29B being arranged so that the vapor flows first in parallel flow heat transfer relation with the gases and then in counterflow heat transfer relation therewith.

The reheater 28 comprises two groups of vertically extending nested multi-looped tubes arranged in laterally spaced panels serially connected to define parallel flow paths for fluid flow in parallel flow heat transfer relation with the gases and between horizontally extending inlet and outlet headers 70 and 71, respectively, disposed within and across the compartment 61. The inlet header 70 receives partially expanded vapor from the turbine by way of a conduit 72 and the finally reheated vapor passes from the header 71 through a conduit 73 to the turbine for final expansion.

Thus in operation the high pressure fluid passing from the fluid heating circuits of the cyclone furnaces flows in parallel upwardly through the radiant heat absorbing tubes of the front, rear and side walls of the furnace 10 and then through the tubes 49 forming the roof of the furnace 10 and the gas pass 17. Thereafter the fluid flows in parallel downwardly through the convection heat absorbing fluid heating tubes 50 and 52 to the header 51, then flows in parallel upwardly through the convection heat absorbing fluid heating tubes of the side walls of the gas passes 17 and 19 to the header 35; then successively passes through the support tubes 34, the primary superheater 30, the secondary superheater 27 and the secondary superheater 29; and then flows to the high pressure stage of the turbine. The vapor generating and superheating surfaces are proportioned and arranged so that the portion of the heated fluid circuit in which the transition of the water from a liquid to a vapor condition occurs will always be located in the relatively low temperature primary superheater 30 throughout the operating range. Partially expanded steam from the turbine passes through the reheater 28 from which it passes to the turbine for final expansion.

In accordance with the invention and as shown in FIGS. 1 and 2, the vapor generating and superheating unit is top-supported at a common elevation by structural steel members including upright members 74 and cross beams 75, from which hanger rods 76, of which only a few are illustrated, support all walls. The secondary superheater 27 is supported from the beams 75 by hanger rods 77 rigidly secured to the inlet and out-therewith, and then downwardly for continuation to the header 63 in the form of tube group 29C of FIG. 1. The upper portion of the tubes of the secondary superheater 29 and reheater 28 are fixedly secured to the roof in sealing relation therewith, the springs 79 and 81 of the hanger rods 78 and 80, respectively, are omitted and the tube portions of the reheater 28 extending through the floor 18 are expansibly secured thereto in sealing relation therewith. The connection of the headers 63 and 71 to the side wall tubes 56 are the same as described in the first embodiment. With this arrangement the principal expansion of the unit is downward, with the headers 63 and 71 moving with the side wall tubes 56, the superheater 29 free to move relative to the wall 20, and the reheater 28 free to move relative to the floor 18. Movements of the boundary wall tubes of the gas pass 17 and the idle compartment 61 relative to the superheater 29 and the reheater 28 are compensated for by the return bend tube portions 29C and 28C, respectively, and, in the case of the superheater 29, by the return bend tube portions passing into and out of the gas passage 19.

While in accordance with the provisions of the statutes I have illustrated and described herein the best form of the invention now known to me, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. In a fluid heating unit, in combination, walls including fluid heating tubes defining a gas pass, said walls including a pair of oppositely disposed upright walls, means supplying high-temperature heating gases to said gas pass, means supplying fluid to said fluid heating tubes, a horizontally extending header disposed outside of said gas pass, a superheater connected for series flow of fluid from said fluid heating tubes and to said header, said superheater comprising a first group of looped tubes disposed in said gas pass and a second group of looped tubes disposed outside of said gas pass and subjacent said first group of tubes and constructed and arranged to compensate for relative movements between said superheater and said fluid heating tubes, with the first and second groups of tubes being arranged in laterally spaced panels serially connected to define parallel flow paths for fluid flow to said header, and means for supporting said fluid heating tubes and said superheater including means for transmitting the load of and securing said header to the fluid heating tubes of said pair of walls, means for top supporting the fluid heating tubes of said pair of walls, and means for top supporting said superheater.

2. In a fluid heating unit, in combination, walls including fluid heating tubes defining a gas pass, means supplying high-temperature heating gases to said gas pass, means supplying fluid to said fluid heating tubes, a horizontally extending header disposed outside of said gas pass, a superheater connected for series flow of fluid from said fluid heating tubes and to said header, said superheater comprising a first group of looped tubes disposed in said gas pass and a second group of looped tubes disposed outside of said gas pass and subjacent said first group of tubes and constructed and arranged to compensate for relative movements between said superheater and said fluid heating tubes, with the first and second groups of tubes being arranged in laterally spaced panels serially connected to define parallel flow paths for fluid flow to said header, said first group of tubes having portions extending through and expansibly secured to one of said walls and other portions extending through and rigidly secured to another of said walls, and means for supporting said fluid heating tubes and said superheater including means for transmitting the load of and securing said header to the fluid heating tubes of a pair of said walls, means for top supporting the fluid heating tubes of said pair of walls, and means for top supporting said superheater.

3. In a fluid heating unit, in combination, walls including fluid heating tubes defining a gas pass, means supplying high-temperature heating gases to said gas pass, means supplying fluid to said fluid heating tubes, a horizontally extending header disposed outside of said gas pass, a superheater connected for series flow of fluid from said fluid heating tubes and to said header, said superheater comprising a first group of looped tubes disposed in said gas pass and a second group of horizontally extending multi-looped tubes disposed outside of said gas pass and subjacent said first group of tubes and constructed and arranged to compensate for relative movements between said superheater and said fluid heating tubes, with the first and second groups of tubes being arranged in laterally spaced panels serially connected to define parallel flow paths for fluid flow to said header, said first group of tubes having portions extending through and expansibly secured to one of said walls and other portions extending through and rigidly secured to another of said walls, and means for supporting said fluid heating tubes and said superheater including means for transmitting the load of and securing said header to the fluid heating tubes of a pair of said walls, means for top supporting the fluid heating tubes of said pair of walls, and means for top supporting said superheater.

4. In a fluid heating unit, in combination, walls including fluid heating tubes defining a gas pass, said walls including a first wall, a second wall, and a pair of oppositely disposed walls, means supplying high-temperature heating gases to said gas pass, means supplying fluid to said fluid heating tubes, a horizontally extending header disposed outside of said gas pass, a superheater connected for series flow of fluid from said heating tubes and to said header, said superheater comprising a first group of looped tubes disposed in said gas pass and a second group of horizontally extending looped tubes disposed outside of said gas pass and subjacent and downstream fluid flow-wise of said first group of tubes and constructed and arranged to compensate for relative movements between said superheater and said fluid heating tubes, with the first and second groups of tubes being arranged in laterally spaced panels serially connected to define parallel flow paths for fluid flow to said header, said first group of tubes having portions extending through and expansibly secured to said first wall and other portions extending through and rigidly secured to said second wall, and means for supporting said fluid heating tubes and said superheater including means for transmitting the load of and securing said header to the fluid heating tubes of said pair of walls, means for top supporting the fluid heating tubes of said pair of walls, and means for top supporting said superheater.

5. In a fluid heating unit, in combination, walls including vapor generating tubes defining a gas pass, said walls including a roof, a floor, and a pair of oppositely disposed upright side walls, means supplying high-temperature heating gases to said gas pass, means supplying fluid to said vapor generating tubes, a horizontally extending header disposed outside of and subjacent said gas pass, a superheater connected for series flow of fluid from said vapor generating tubes and to said header, said superheater comprising a first group of upright multi-looped tubes disposed in said gas pass and a second group of horizontally extending multi-looped tubes disposed outside of said gas pass and between said floor and said header and constructed and arranged to compensate for relative movements between said superheater and said vapor generating tubes, with the first and second groups of tubes being arranged in laterally spaced panels serially connected to define parallel flow paths for fluid flow to said header, said first group of tubes having inlet portions extending through and expansibly secured to said roof and outlet portions extending through and rigidly let headers 65 and 66. The supporting members for the secondary superheater 29 include hanger rods 78 carried by the beams 75 and suitably rigidly connected to the header 62 and to return bend tube portions at the upper end of tube group 29B, with each rod 78 having a spring element 79 at its upper end to permit vertical movement of the superheater 29. The support members for the reheater 28 comprise hanger rods 80 carried by the beams 75 and rigidly connected in known manner to the return bend tube portions at the upper end of the reheater, with each rod having a spring element 81 at its upper end to allow vertical movement of the reheater. The upper portions of the tubes of the secondary superheaters 27 and 29 and the reheater 28 pass through the roof 14 for securement of supports and are expansibly secured to the roof in sealing relation therewith to permit differential movement.

As shown in FIGS. 3 and 5–9, the floor 18 of the gas pass 17 is formed by rigidly interconnected rectangular metallic plates 82 and channel members 83, lined by and fixedly secured to extensions of the tubes 40 of the rear walls, with transversely spaced stiffener plates 84 secured to the outer side of the plates 82 and extending between the channels 83 to resist bending of the plates. The plates 82 next adjacent the side wall tubes 56 are fixedly secured thereto. The channels 83 are disposed at spaced positions along the length of the floor and are expansibly secured at their opposite ends to the side wall tubes 56. The channel 83 adjacent the wall tubes 50 is also rigidly secured thereto. The floor is carried by I-beams 85 extending between and expansibly secured to the side wall tubes 56, which in turn transmit the load to the corresponding hanger rods 76. The metallic plates 82 are formed with circular openings and intermediate portions of the floor tubes of the gas pass 17 are suitably bent to permit passage through the floor of the tubes of the secondary superheater 29B to the header 63 and the tubes of the reheater 28 to the headers 70 and 71. The tube portions of the superheater and reheater extending through the floor are rigidly secured to the plates 82 by metallic sleeves 86 around the tubes at the outer side of the plates having their lower ends welded to the tubes and their upper ends welded to the plates 82 along the periphery of the tube openings formed therein.

The headers 63 and 71 are supported by saddles 87 which are expansibly secured thereto to permit longitudinal movement of the headers. The saddles 87 are carried by transversely spaced beams 88 extending between and normal to a pair of transversely extending I-beams 89 and 90, with each beam 88 having one end fixedly secured and carried by the beam 90 and its opposite end expansibly secured to and carried by the beam 89 to permit lateral movement thereof. As illustrated in FIGS. 9–13, the I-beams 89, 90 transmit the load to the side wall tubes 56, which in turn pass it to corresponding hanger rods 76 by a supporting structure comprising hanger rods 91 connecting the ends of the beams 89, 90 to the corresponding side wall tubes 56. Each rod 91 is bolted at its lower end to a bracket 92 secured by bolts to a corresponding beam end and is pivotally connected at its upper end to a pair of transversely spaced and aligned U-shaped lugs 93 by pins 97 engaging the rod and the lugs, with the lugs 93 at each end of the beam 89 being aligned and connected with each other and with the lugs at the corresponding end of the beam 90 by a pair of oppositely arranged horizontally extending rectangular plates 94 secured by welding to the inside of the legs of the lugs 93 and disposed at opposite sides of and in contacting relationship with the corresponding side wall tubes 56. The plates 94 are carried by rectangular shear lugs 95 disposed between and welded to the side wall tubes 56 situated opposite the corresponding plates 94. The side wall tubes 56 directly opposite the ends of the beams 89 and 90 are outwardly offset to clear the supporting structure therefor. Thus the above described connections between the headers 63, 71 and the side wall tubes 56 serve to transmit the load of the headers to the tubes 56 and maintain a fixed relationship between these members upon vertical movement thereof.

Since the reheater and superheater outlet headers 71 and 63 are structurally tied to the side wall tubes 56 and portions of the tubes of the superheater 29 and reheater 28 are fixedly secured to the floor 18, it becomes necessary to provide for the differential expansions occasioned by the considerable difference in the temperatures of the fluid flowing to the headers 63 and 71 as compared to the temperature of the fluid flowing through the boundary wall tubes of the gas pass 17 and the idle compartment 61. These temperature differences amount to several hundred degrees under full load conditions, for the temperature of the fluid flowing through the boundary wall tubes of the gas pass 17 and the compartment 61 is at the saturation temperature corresponding to the pressure in these tubes and the temperatures of the fluids passing to the superheater and reheater outlet headers 63 and 71 are 1050° F. and 1000° F., respectively. In accordance with the invention and as illustrated in FIG. 3, these differential expansions are compensated for by bending the discharge portion of the tubes of the superheater 29 and the reheater 28 into nested multi-looped horizontally extending tube groups 29C and 28C, respectively, arranged in laterally spaced panels and situated between the floor 18 and their corresponding outlet headers. While the inlet portions of the tubes of the reheater 28 are fixedly secured to the floor 18, there is relatively little expansion between these tube portions and the adjacent boundary wall tubes during normal operation since the fluid returning from the turbine is at a temperature close to the temperature of the fluid passing through the adjacent boundary wall tubes. Accordingly, each of the reheater tube portions between the header 70 and the floor 18 is formed with a single loop to allow for differential expansions.

With the vapor and superheating tubes supported as described, the principal expansion of the unit is downward, with the headers 63 and 71 moving with the side wall tubes 56 and with the superheaters 27 and 29 and the reheater 28 free to move vertically relative to the roof 14. Movement of the boundary wall tubes of the gas pass 17 and the idle compartment 61 relative to the reheater and superheater are compensated for by the return bend tube portions 28C and 29C, respectively, and by the springs 81 and 79.

As a modification to the arrangement of FIG. 1, the springs 79 and 81 of the hanger rods 78 and 80, respectively, may be omitted, in which case the upper portion of the tubes of the secondary superheater 29 and reheater 28 are fixedly secured to the roof 14 in sealing relation therewith and the top portions of the superheater 29 and reheater 28 extending through the floor 18 are expansibly secured thereto in sealing relation therewith. The connection of the headers 63 and 71 to the side wall tubes 56 and the arrangement of the tube groups 28C and 29C are the same as described in the first embodiment. With this arrangement the principal expansion of the unit is downward, with the headers 63 and 71 moving with the side wall tubes 56 and with the superheater 29 and the reheater 28 free to move vertically relative to the floor 18. Movements of the boundary wall tubes of the gas pass 17 and the compartment 61 relative to the reheater 28 and superheater 29 are compensated for by the return bend tube portions 28C and 29C, respectively.

In the modification illustrated in FIG. 14, the discharge portion of the tubes of the superheater 29 extend upwardly above and parallel to the floor 18 for free passage between the tubes of the screen 44 and into the gas passage 19, then downwardly in the gas passage 19 and parallel to the wall 20, then horizontally below the floor 18 and through the wall 20 in fixed sealing relationship secured to said floor, and means for supporting said vapor generating tubes and said superheater including means for transmitting the load of and securing said header to the vapor generating tubes of said side walls, means for top supporting the vapor generating tubes of said side walls, and means for top supporting said superheater while permitting vertical movement thereof relative to said roof.

References Cited in the file of this patent

UNITED STATES PATENTS 2,835,231   Evans et al. _____ May 20, 1950

FOREIGN PATENTS 802,120   France _____ June 6, 1936